United States Patent [19]

Unland

[11] Patent Number: 4,878,949
[45] Date of Patent: Nov. 7, 1989

[54] METHOD FOR THE PRODUCTION OF CEMENT CLINKER FROM SEMI-WET RAW MATERIAL

[75] Inventor: Georg Unland, Ennigerloh, Fed. Rep. of Germany

[73] Assignee: Krupp Polysius AG, Fed. Rep. of Germany

[21] Appl. No.: 156,294

[22] Filed: Feb. 16, 1988

[30] Foreign Application Priority Data

Feb. 17, 1987 [DE] Fed. Rep. of Germany ....... 3705037

[51] Int. Cl.$^4$ .............................................. C04B 7/43
[52] U.S. Cl. .................................... 106/100; 106/102
[58] Field of Search ................................ 106/100, 102

[56] References Cited

U.S. PATENT DOCUMENTS 3,986,819 10/1976 Heian .................................. 106/100
4,248,641 2/1981 Deussner ............................. 106/100

Primary Examiner—Mark L. Bell
Assistant Examiner—Anthony J. Green
Attorney, Agent, or Firm—Learman & McCulloch

[57] ABSTRACT

The invention relates to a method and to apparatus for the production of cement clinker by the semi-wet process, in which a two-stage preheater supplied with additional fuel and a short rotary kiln are used and exhaust air from the cooler is delivered directly to the drying zone. In this way, even if the moisture content of the filter cake varies, it is possible to operate the kiln plant with a constant degree of deacidification and to ensure a stable kiln operation.

5 Claims, 1 Drawing Sheet

U.S. Patent    Nov. 7, 1989    4,878,949
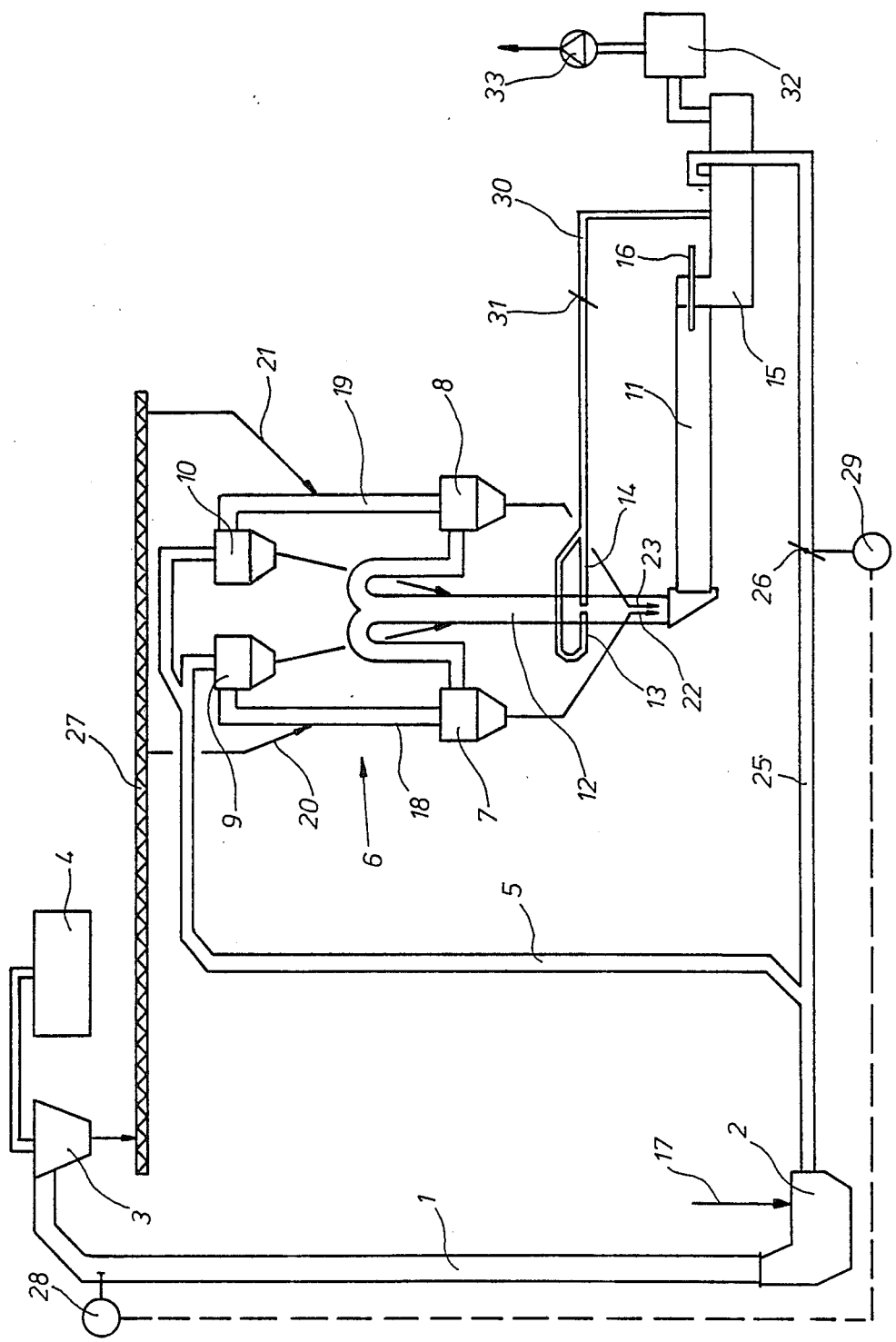

METHOD FOR THE PRODUCTION OF CEMENT CLINKER FROM SEMI-WET RAW MATERIAL

The invention relates to a method and to an apparatus for the production of cement clinker by the semi-wet process.

A method of producing cement clinker by the semi-wet process is known for example from "Zement-Kalk-Gips" 1977, pages 369 to 371, illustration 4. In this disclosure the filter cake is dried in an impact dryer and crushed. The raw material is then preheated in a two-stage cyclone preheater with the exhaust gases from a rotary kiln and then burnt to clinker in a long rotary kiln.

The principal disadvantage of this method is that as a cyclone preheater consisting of only two stages is used the deacidification of the raw material has to take place practically exclusively in the rotary kiln, which results in a great kiln length. On the other hand, the number of stages of the preheater cannot be increased since otherwise the exhaust gases from the preheater no longer have the heat content necessary for the drying of the filter cake. In order for it to be possible to dry the filter cake sufficiently with the available exhaust gases from the two-stage preheater, in the known method a comparatively large proportion of the water must be removed from the filter cake, which necessitates high expenditure on plant for the filtration.

Apparatus for the production of cement clinker by the semi-wet process is disclosed in DE-A-2 944 659, wherein the material is not only heated in the two-stage preheater with the exhaust gases from the combustion zone but is deacidified by additional fuel. At the same time, this additional fuel which is delivered to the preheated zone heats the exhaust gases from the preheating zone so that even filter cakes with a relatively high moisture content can be dried sufficiently. In this way it is possible to lower the expenditure on plant which is necessary for the mechanical filtration.

The raw material prepared in the semi-wet process generally has a moisture content which varies within comparatively wide limits. If no special measures are taken, the consequence of this is that the material reaches the combustion zone with a varying degree of deacidification depending upon the moisture content of the raw material. Since this would restrict the stability of the kiln operation, a comparatively complicated means for regulating the additional fuel delivered to the preheating zone is provided in the known method according to DE-A-2 944 659.

The object of the invention is to provide a method and apparatus for the production of cement clinker by the semi-wet process wherein the material enters the combustion zone with an approximately uniform degree of deacidification—irrespective of the particular moisture content of the wet-cleaned raw material—so that a stable kiln operation is ensured.

According to the invention exhaust air from the cooler is passed directly to the drying zone, bypassing the combustion and preheating zone, and the quantity of exhaust air from the cooler which is delivered directly to the drying zone is adjusted as a function of the moisture content of the filter cake delivered to the drying zone so that the material reaches the combustion zone with an almost constant degree of deacidification.

In this way the kiln plant is operated with a constant degree of deacidification (precalcination rate). The necessary alterations of the heat supply to the drying zone as a function of the fluctuating moisture content of the filter cake are carried out by adjusting the quantity of exhaust air from the cooler delivered to the drying zone. In this way a particularly stable kiln operation is ensured.

The use according to the invention of exhaust air from the cooler in the drying zone also has the advantage that the moisture content of the feed material in the drying zone can be raised or the heat consumption at a given moisture content of the raw material can be lowered.

Apparatus for carrying out the method according to the invention is illustrated schematically in the drawing.

The apparatus contains conventional filtration apparatus (not shown) for the mechanical removal of water from the wet-cleaned raw material, and also apparatus for drying and crushing the filter cake. The drying is accomplished in a drying zone formed by a shaft 1 and the crushing is accomplished in a crushing zone formed by a single-shaft hammer mill 2 which is connected to the lower end of the shaft dryer 1. The shaft dryer 1 leads to a separator 3 after which an electric dust remover 4 is connected.

The hammer mill 2 is connected to the exhaust gas pipe 5 of a two-stage cyclone preheater 6 which includes cyclones 7, 8, 9 and 10.

Burners 13, 14 for the supply of additional fuel are provided in the rising exhaust gas pipe 12 leading from a rotary kiln 11 to the cyclones 7, 8 of the first stage of the cyclone preheater zone 6.

The rotary kiln 11 forms a combustion zone which is heated by a burner 16 is connected at its discharge end to a separate cooler 15 forming a cooling zone.

A pipe 25 for exhaust air from the cooler leads from the cooler 15 to the hammer mill 2 and has an adjustable valve 26 provided in it. In the illustrated embodiment this exhaust air pipe 25 opens into the exhaust gas pipe 5 from the cyclone preheater 6 shortly before the hammer mill 2; it is, however, also possible to provide a separate connection of the exhaust air pipe 25 to the hammer mill 2.

The rotary kiln 11 is constructed as a short rotary kiln. The ratio of length L to diameter D is between 12 and 17. The specific throughput rate per unit of volume of the rotary kiln is advantageously between 1.5 and 2.5 tons per day/m$^3$.

A tertiary air pipe 30 leads from the cooler 15 to the burners 13, 14 of the cyclone preheater 6. A valve 31 serves for adjustment of the quantity of tertiary air.

Dust removing apparatus 32 is connected to the cooler 15. Excess air is drawn off via this dust removing arrangement 32 by means of a fan 33.

The gas temperature in the shaft dryer 1 is determined by means of a temperature gauge 28. The measured temperature value is passed to a setting device 29 which influences the setting or control of the valve 26 provided in the pipe 25 for the exhaust air from the cooler.

Conveying apparatus 27 is provided between the separator 3 and the cyclone preheater 6.

The illustrated apparatus functions as follows:

The rotary kiln 11 is heated in the usual way at its discharge end by means of the burner 16. It receives secondary air from the cooler 15. The secondary air required for the burners 13, 14 in the cyclone preheater is delivered via the tertiary air pipe 30.

The exhaust gases from the rotary kiln 11 are further heated in the rising pipe 12 by the burners 13 and 14. They pass in succession through the two stages of the two-stage cyclone preheater and then pass via the exhaust gas pipe 5 to the hammer mill 2 and to the shaft dryer 1. Dust is removed from the exhaust gases in the electric dust remover 4.

A quantity of exhaust air from the cooler which can be adjusted by means of the valve 26 is delivered from the cooler 15 via the exhaust air pipe 25 directly, that is to say bypassing the rotary kiln 11 and the cyclone preheater 6, to the hammer mill 2 and the shaft dryer 1.

The filter cake produced by mechanical water removal is delivered to the hammer mill 2 (arrow 17). In the hammer mill 2 the filter cake is dried by the hot gases supplied via the exhaust gas pipe 5 and the pipe 25 for exhaust air from the cooler and is crushed. Subsequent drying takes place in the shaft dryer 1 through which the raw material which has been sufficiently dried and crushed is conveyed by means of the hot gases to the separator 3.

From the separator 3 the raw material passes via the conveyor means 27 to the cyclone preheater 6 where it is delivered (arrows 20, 21) to the gas pipes 18, 19 (which connect the cyclones 7 and 9 or 8 and 10 respectively to one another).

The material precipitated in the cyclones 9 and 10 is introduced into the rising pipe 12 and is here greatly heated or partially deacidified by the hot exhaust gases which are heated by means of the burners 13, 14.

The material which is then precipitated in the cyclones 7 and 8 passes into the rotary kiln 11 (arrows 22, 23), is burnt to clinker there and cooled in the cooler 15.

The additional fuel which is delivered via the burners 13, 14 to the cyclone preheater 6 serves for further heating and partial deacidification of the preheated material and for the further heating of the exhaust gases with a view to the necessary drying of the filter cake.

The quantity of exhaust air from the cooler which is delivered via the exhaust air pipe 25 directly to the drying zone (shaft dryer 1 with hammer mill 2) is adjusted as a function of the moisture content of the filter cake so that the material passes into the combustion zone, i.e. the rotary kiln 11, with an almost constant degree of deacidification.

For this purpose the temperature of the hot gases in the shaft dryer 1 is measured for example by means of the temperature gauge 28 and as a function of this measured temperature value the valve 26 in the exhaust air pipe 25 from the cooler is adjusted via the setting device 29.

The quantity of exhaust air from the cooler which is delivered directly to the drying zone via the exhaust air pipe 25—taking account of the additional fuel delivered to the preheating zone (via the burners 13, 14)—is advantageously such that the filter cake is dried in the drying zone to a moisture content of at most 2%, preferably at most 1%.

The exhaust gases from the cyclone preheater 6 advantageously have a temperature of at least 600° C.

The invention will now be explained in greater detail with the aid of an example:

EXAMPLE

An existing cement works operating by the wet process is to be converted to an energy-saving process. Since minimum investment costs are to be incurred the existing wet cleaning is retained. In order to carry out the method according to the invention the conversion is carried out as follows:

Starting with the existing wet mills and slurry tanks, water is continuously removed from the slurry in continuously operating filters, e.g. belt filters. Depending upon the nature of the material the moisture content varies between 18 and 23%. By making the filters suitably large or by installing stand-by filters it is possible to avoid the installation of any additional storage vessels for filter cakes after the filters. The slurry which has been predried in this way is continuously delivered to a dryer, for example a rising pipe dryer. The moisture content of the filter cakes delivered to the rising pipe dryer varies for example between 18% (minimum) and 23% (maximum) as as result of variations in the material and differing degrees of water removal in the filters. The end temperature of the gases after the rising pipe dryer should not fall below 110° C. in order to avoid dew point problems. Therefore the rising pipe dryer on the one hand receives kiln exhaust gases of approximately 580° C. and on the other hand is connected to the cooler by a separate pipe. Hot gases at approximately 350° to 400° C. are extracted via this pipe. For constant operation of the apparatus the quantity of fuel in the kiln system should be kept constant. Variations in the quantity of heat required (as a result of the differing moisture content of the filter cake) are therefore equalised by the additional quantity of hot air delivered to the rising pipe dryer from the cooler (during this the quantity of secondary air delivered to the rotary kiln 11 and the quantity of tertiary air delivered to the burners 13, 14 remain constant; the quantity of exhaust air from the cooler delivered to the rising pipe dryer is taken from the excess air from the cooler which would otherwise have to have the dust removed). This is advantageously achieved operationally by measuring the temperature of the hot gases at the upper end of the rising pipe dryer and as a function thereof controlling the valve position in the exhaust air pipe which leads from the cooler to the rising pipe dryer.

The material dried in the rising pipe dryer is fed via a separating cyclone into a two-stage preheater. Here the material is further preheated and then delivered to a calciner. At this point fuel is delivered in order to deacidify the material to such an extent that clinker minerals can be formed from the deacidified raw material in a short rotary kiln through which it next passes. In the precalciner approximately 30% of the fuel introduced is converted. Because of the high degree of prior deacidification the kiln can be constructed as a short kiln with a ratio of length to diameter of approximately 15. For a capacity of for example 700 t/d clinker the kiln size would be 3.4×50 m.

With such apparatus the following heat balances are produced for the kiln plant and the dryer, assuming a moisture content of the filter cake of 21% (if the moisture content is higher then exhausted air from the cooler is delivered to the dryer).

| 1 | Heat balance of the total plant (including dryer) | |
|---|---|---|
| | Heat input: | kcal/kg clinker |
| | fuel precalcination | 293 |
| | fuel main burner | 682 |
| | total input: | 975 |
| | Heat output: | kcal/kg clinker |
| | Q theoretical | 420 |
| | Q-H$_2$O evaporation | 245 |

| -continued | |
|---|---|
| cooler losses ($\eta \approx 70\%$) | 95 |
| exhaust gas losses (2.51 $m^3_n$/kg. 133° C.) | |
| dust losses (7%) | 2 |
| radiation losses | |
| kiln 85 | |
| heat exchanger 20 | |
| dryer 10 | 115 |
| total output: | 975 |

2. Heat balance of the dryer

| Heat input | kcal/kg clinker |
|---|---|
| kiln exhaust gases: | |
| 1.74 $m^3_n$/kg clinker, 579° C. | 360 |
| dust from the kiln: | |
| 0.20 kg/kg clinker, 579° C. | 27 |
| exhaust air from the cooler (if moisture content higher than 21%) | X |
| total input: | 387 + X |

| Heat output | kcal/kg clinker |
|---|---|
| Q-H$_2$O evaporation (21% H$_2$O) | 245 |
| exhaust gas losses: | |
| 2.51 $m^3_n$/kg clinker, 133° C. | 98 |
| dust losses: | |
| 0.07 kg/kg clinker, 133° C. | 2 |
| radiation | 10 |
| material to the kiln: | |
| 1.7 kg/kg clinker, 113° C. | 32 |
| Total output: | 387 |

We claim:

1. In a method of producing cement clinker from semi-wet raw material from which moisture has been removed to form a filter cake which subsequently is dried in a drying zone and crushed in a crushing zone, and wherein the dried and crushed material is heated and deacidified in a preheating zone and then burnt to clinker in a combustion zone and finally cooled in a cooling zone, the improvement comprising supplying exhaust air from said cooling zone directly to said drying zone bypassing the combustion zone and the preheating zone, and adjusting the quantity of said exhaust air to reduce the moisture content of said filter cake and maintain the moisture content of said filter cake prior to crushing thereof at not more than about 2% to maintain substantially constant the degree of acidification of crushed material delivered to said combustion zone.

2. The method according to claim 1 including directing exhaust gases from said preheating zone into said drying zone to dry said filter cake.

3. The method according to claim 1 including maintaining in said combustion zone a length to diameter ratio of between about 12 and 17.

4. The method according to claim 1 including maintaining a throughput of clinker of between about 1.5 and 2.5 tons per day per cubic meter of the volume of said combustion zone.

5. The method according to claim 1 wherein the air supplied to said drying zone from said cooling zone is such that the dried filter cake has a moisture content of not more than about 1%.

* * * * *

UNITED STATES PATENT AND TRADEMARK OFFICE
CERTIFICATE OF CORRECTION

PATENT NO. : 4,878,949

DATED : November 7, 1989

INVENTOR(S) : Georg Unland

It is certified that error appears in the above-identified patent and that said Letters Patent is hereby corrected as shown below:

Column 2, line 57, insert -- or control -- after "setting".

Column 2, line 58, cancel "or control".

Column 4, line 57, change "exhausted" to -- exhaust --.

Column 5, line 3, insert -- 98 -- after "exhaust gas losses (2.51 m³n/kg. 133°C.)"

Signed and Sealed this

Twenty-third Day of October, 1990

*Attest:*

HARRY F. MANBECK, JR.

*Attesting Officer*   *Commissioner of Patents and Trademarks*